Patented July 6, 1943

2,323,643

UNITED STATES PATENT OFFICE 2,323,643

GLASS COMPOSITION

George E. Barton, Millville, N. J., assignor to Armstrong Cork Company, Lancaster, Pa., a corporation of Pennsylvania No Drawing. Application August 1, 1940, Serial No. 349,306

12 Claims. (Cl. 106—54)

The invention relates to a glass composition, especially one suitable for the machine manufacture of glass articles, particularly containers, insulators, and the like.

It is an object of the invention to produce a glass having improved stability and chemical durability.

A further object is to produce a glass having improved resistance to weathering.

A further object is to produce a glass which will show a decreased interaction with drugs, chemicals, food products, and beverages, particularly alcoholic beverages, such as gin and whiskey.

It is also an object of the invention to produce a glass which is substantially free of "flaking." By the term "flaking" is meant that form of interaction which produces insoluble spicules which generally form a sediment in the beverage or other liquid in containers made of some glasses.

It is a further object to produce a glass having the capability of being melted and refined at speeds and temperatures not greatly different from those of glass compositions heretofore produced so that furnace capacity shall not be reduced.

A further object is to produce a glass having such a composition that the attack by the molten glass upon the refractory lining of the melting furnace shall remain approximately as small as heretofore.

A further object is to produce a glass composition sufficiently stable to be melted, fashioned into articles, and annealed, by methods well known to the art, without loss from devitrification.

It is a further object to produce a glass having viscosities at the temperatures used for fashioning the glass into shaped articles approximating those of bottle glasses made heretofore so that operating difficulties with the machines in conventional use will be minimized.

It is a further object to produce a glass composition in which the aforementioned objectives will be attained without serious increase in cost over that of the container compositions heretofore used.

It has long been known that the chemical durability of glass can be increased by increasing its boric oxide, alumina, or lime contents. (In the specification and claims the word "lime" is to be understood to include calcium oxide and mixtures of calcium oxide and magnesium oxide in which the proportion of magnesium oxide may be present up to the upper limit as derived from common varieties of dolomite). However, the feasible content of boric oxide is limited by the high cost. The use of increased amounts either of alumina or of lime individually tends to produce working qualities unfavorable to the fashioning of containers by conventional machines. Moreover increased concentrations of lime also tend to produce devitrification of the glass. It is recognized that these manufacturing difficulties might be alleviated by the incorporation into the glass of increased amounts of boric oxide or of an alkali metal oxide, such as sodium oxide or potassium oxide, which, however, are expensive and therefore increased amounts are not practicable for the production of ordinary container glass. Furthermore, the alkali metal oxides have the additional characteristic of decreasing the chemical durability.

It has now been found that glass compositions which have markedly greater durability than container glasses heretofore produced and which may be commercially melted within the usual temperature range, and which possess working qualities for the production of containers and other articles on conventional machines, and which show no tendency toward devitrification, can be made without the use of larger amounts of boric oxide or alkali metal oxides than have been heretofore employed in low-alumina container glass compositions. These results are produced by the simultaneous use of an increased alumina content, ranging from about 2.4 to 4.2 per cent, and of an increased lime content, ranging from about 10 to 12 per cent, with the reduction of the alkali metal oxide content to the range of from about 13 to 14½ per cent. The attainment of these results is the more remarkable in that by the above combination of alumina and lime, glasses are produced which have the desirable characteristics associated with the use of these ingredients, while at the same time the undesirable effects ordinarily associated with the use of each individual ingredient separately is obviated. These results illustrate the incompleteness of present-day knowledge concerning the complex system which comprises glass compositions.

More specifically, glass compositions having the improved durability and fulfilling the requirements outlined above adapting them for the machine manufacture of articles, such as bottles, have approximately the following overall and preferred ranges respectively:

Table I

| | Overall range | Preferred range |
|---|---|---|
| | Per cent | Per cent |
| $SiO_2$ | 69 to 72½ | 70½ to 72 |
| Lime | 10 to 12 | 10½ to 11½ |
| $Na_2O+K_2O$ | 13 to 14½ | 13.6 to 14.2 |
| $Al_2O_3$ | 2.4 to 4.2 | 2.4 to 2.9 |

Besides the constitutents just mentioned, the new glass composition contains from about 0.4 to 1 or more of $B_2O_3$ and from 0.4 to 1% of barium oxide.

The alkali metal oxide preferred consists mainly of sodium oxide.

The lime may be substantially all calcium oxide, or it may contain various amounts of magnesia up to the proportion in which it is present in lime produced from dolomite. Increase of the proportion of magnesia imparts improved durability, and the overall and preferred ranges of these constituents when derived from dolomite are as follows:

Table II

|  | Overall range | Preferred range |
| --- | --- | --- |
|  | Per cent | Per cent |
| CaO | 6 to 7 | 6.4 to 6.9 |
| MgO | 4 to 5 | 4.2 to 4.7 |

The overall and preferred ranges of these constituents when derived from so-called calcite- or low magnesium-limestone are as follows:

Table III

|  | Overall range | Preferred range |
| --- | --- | --- |
|  | Per cent | Per cent |
| CaO | 9.7 to 11.6 | 10.3 to 11.2 |
| MgO | 0.3 to 0.4 | 0.3 to 0.4 |

It is to be understood that any relative proportions of calcium oxide and magnesium oxide which lie within the limits given in the Tables II and III may be used provided that the upper and lower limits given in Table I are not exceeded by the sum of the two constituents.

In the case of producing ordinary flint glass, a small amount of a decolorizer, such as selenium and cobalt, with or without nickel, or compounds containing these elements, may be added to the batch. Amber glass or glasses of other colors, may be produced by incorporating into the batch suitable coloring materials, well known to those skilled in the art.

The following examples of compositions obtained by incorporating conventional materials in the proper amounts into the batches used, are illustrative of the invention:

Example 1

Flint glass composition:

| | |
|---|---|
| $SiO_2$ | 71.1 |
| $Na_2O+K_2O$ | 13.6 |
| CaO | 6.5 |
| MgO | 4.5 |
| $Al_2O_3$ | 2.8 |
| BaO | 0.6 |
| $B_2O_3$ | 0.85 |
| $Fe_2O_3$ | 0.05 |

Example 2

Flint glass composition:

| | |
|---|---|
| $SiO_2$ | 71.9 |
| $Na_2O+K_2O$ | 13.8 |
| CaO | 6.2 |
| MgO | 4.1 |
| $Al_2O_3$ | 2.6 |
| BaO | 0.5 |
| $B_2O_3$ | 0.8 |
| $Fe_2O_3$ | 0.06 |

This glass composition has a softening temperature of 730° C., annealing temperature 542° C., and strain temperature of 506° C.

Example 3

Flint glass composition:

| | |
|---|---|
| $SiO_2$ | 69.19 |
| $Na_2O+K_2O$ | 14.45 |
| CaO | 6.44 |
| MgO | 4.38 |
| $Al_2O_3$ | 4.06 |
| BaO | 0.54 |
| $B_2O_3$ | 0.88 |
| $Fe_2O_3$ | 0.064 |

Example 4

An amber glass composition is as follows:

| | |
|---|---|
| $SiO_2$ | 70.75 |
| $Na_2O+K_2O$ | 13.39 |
| CaO | 10.65 |
| MgO | 0.58 |
| $Al_2O_3$ | 2.74 |
| BaO | 0.88 |
| $B_2O_3$ | 0.86 |
| $Fe_2O_3$ | 0.15 |

The physical properties of this amber glass composition are: Softening temperature of 733° C., annealing temperature of 554° C., and a strain temperature of 513° C.

The durability of the glass compositions was determined by means of storage tests for the duration of a year under conditions approximating those of temperate, desert, and of humid tropical climates, and also by subjecting bottles made of the glass composition to arbitrary accelerated tests in an autoclave, upon both crushed bottle glass samples and also the actual interior surfaces of bottles.

The weathering, or storage tests under severe conditions of high temperature and high relative humidity of the new glass composition produced a coating upon the surface of the glass which is scarcely visible to the eye, while ordinary glasses heretofore made for container purposes under similar conditions of tests acquire a grayish-white, frosted, practically opaque coating on the glass surface. The new glass compositions, when subjected to storage tests involving severe conditions of high temperature and high relative humidity, show only about $1/15$ to $1/30$ the decomposition that occurs with bottle glasses heretofore produced.

The results of the accelerated tests carried out on recently manufactured, unweathered samples indicate that the new glass compositions undergo in such tests only about one-fourth to one-fifth the decomposition that occurs with bottle glasses heretofore produced.

While the invention has been disclosed in terms of specific examples employing certain materials in definitely stated proportions, the description is intended to be merely illustrative. It is obvious that various modifications may be made without departing from the spirit of the invention, and it is to be understood that the invention is limited only by the appended claims.

I claim:

1. A glass composition having high chemical durability and being suitable for machine molding of bottles comprising 69% to 72½% silica, 13% to 14½% alkali metal oxide, 2.4% to 4.2% alumina, 10% to 12% lime, and 0.4% to 1% boric oxide.

2. A glass composition having high chemical durability and being suitable for machine molding of bottles comprising 69% to 72½% silica, 13 to 14½% alkali metal oxide, 2.4% to 4.2% alumina, 10% to 12% dolomitic lime, and 0.4% to 1% boric oxide.

3. A glass composition having high chemical durability and being suitable for machine molding of bottles comprising 69% to 72½% silica, 13% to 14½% alkali metal oxide, 2.4% to 4.2% alumina, 6% to 7% calcium oxide, 4% to 5% magnesium oxide, and 0.4% to 1% boric acid.

4. A glass composition having high chemical durability and being suitable for machine molding of bottles comprising approximately 69% to 72½% silica, 13% to 14½% alkali metal oxide, 2.4% to 4.2% alumina, 10% to 12% lime, 0.4% to 1% boric oxide and 0.4% to 1% barium oxide.

5. A glass composition having high chemical durability and being suitable for machine molding of bottles comprising approximately 69% to 72½% silica, 13% to 14½% alkali metal oxide, 2.4% to 4.2% alumina, 10% to 12% dolomitic lime, 0.4% to 1% boric oxide and 0.4% to 1% barium oxide.

6. A glass composition having high chemical durability and being suitable for machine molding of bottles comprising approximately 69% to 72½% silica, 13% to 14½% alkali metal oxide, 2.4% to 4.2% alumina, 6% to 7% calcium oxide, 4% to 5% magnesium oxide, 0.4% to 1% boric oxide and 0.4% to 1% barium oxide.

7. A glass composition having high chemical durability and being suitable for machine molding of bottles comprising 70½% to 72% silica, 13.6% to 14.2% alkali metal oxide, 2.4% to 4.2% alumina, 10½% to 11½% lime, and 0.4% to 1% boric oxide.

8. A glass composition having high chemical durability and being suitable for machine molding of bottles comprising 70½% to 72% silica, 13.6% to 14.2% alkali metal oxide, 2.4% to 4.2% alumina, 10½% to 11½ dolomitic lime, and 0.4% to 1% boric oxide.

9. A glass composition having high chemical durability and being suitable for machine molding of bottles comprising 70½% to 72% silica, 13.6% to 14.2% alkali metal oxide, 2.4% to 4.2% alumina, 6.4% to 6.9% calcium oxide, 4.2% to 4.7% magnesium oxide, and 0.4% to 1% boric oxide.

10. A glass composition having high chemical durability and being suitable for machine molding of bottles comprising approximately 71.1% silica, 13.6% alkali metal oxide, 6.5% calcium oxide, 4.5% magnesium oxide, 2.8% alumina, 0.6% barium oxide, and 0.8% boric oxide.

11. A glass composition having high chemical durability and being suitable for machine molding of bottles comprising approximately 69.2% silica, 14.5% alkali metal oxide, 6.4% calcium oxide, 4.4% magnesium oxide, 4% alumina, 0.5% barium oxide, and 0.9% boric oxide.

12. A glass composition having high chemical durability and being suitable for machine molding of bottles comprising approximately 70.8% silica, 13.4% alkali metal oxide, 10.6% calcium oxide, 0.6% magnesium oxide, 2.7% alumina, 0.9% barium oxide, and 0.9% boric oxide.

GEORGE E. BARTON.

CERTIFICATE OF CORRECTION.

Patent No. 2,323,643. July 6, 1943.

GEORGE E. BARTON

It is hereby certified that error appears in the printed specification of the above numbered patent, requiring correction as follows: Page 2, first column, line 3, for "1 or more" read --1% or more--; page 3, first column, line 3, claim 2, for "13 to" read --13% to--; line 11, claim 3, for "acid" read --oxide--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.